United States Patent
Sato

(10) Patent No.: US 10,687,067 B2
(45) Date of Patent: Jun. 16, 2020

(54) TRANSMITTER, TRANSMISSION METHOD, AND COMMUNICATION SYSTEM

(71) Applicant: SONY CORPORATION, Tokyo (JP)

(72) Inventor: Hiroki Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 70 days.

(21) Appl. No.: 15/580,347

(22) PCT Filed: May 10, 2016

(86) PCT No.: PCT/JP2016/063859
§ 371 (c)(1),
(2) Date: Dec. 7, 2017

(87) PCT Pub. No.: WO2016/203870
PCT Pub. Date: Dec. 22, 2016

(65) Prior Publication Data
US 2018/0167621 A1    Jun. 14, 2018

(30) Foreign Application Priority Data

Jun. 17, 2015  (JP) .................................. 2015-122191

(51) Int. Cl.
*H04N 19/172* (2014.01)
*H04L 1/00* (2006.01)
(Continued)

(52) U.S. Cl.
CPC ............. *H04N 19/172* (2014.11); *H04L 1/00* (2013.01); *H04L 1/007* (2013.01); *H04L 1/0009* (2013.01);
(Continued)

(58) Field of Classification Search
CPC ......... H04L 1/00; H04L 1/004; H04L 1/0009; H04L 1/0041; H04L 1/0002;
(Continued)

(56) References Cited

U.S. PATENT DOCUMENTS 7,539,925 B2 * 5/2009 Yamane ............ H03M 13/2707
714/774
7,958,435 B2 * 6/2011 Kure ..................... H04L 1/1877
714/749

(Continued)

FOREIGN PATENT DOCUMENTS

JP    2008-11096 A    1/2008
JP    2010-183439 A   8/2010
(Continued)

OTHER PUBLICATIONS

International Search Report dated Aug. 2, 2016 in PCT/JP2016/063859.
(Continued)

*Primary Examiner* — Nathnael Aynalem
(74) *Attorney, Agent, or Firm* — Oblon, McClelland, Maier & Neustadt, L.L.P.

(57) ABSTRACT

There is provided a transmitter including: a transmission unit configured to transmit a parity packet obtained by performing FEC encoding on a plurality of frames in image data for each of the plurality of frames; and a number-of-frames specifying unit configured to specify the number of frames of the plurality of frames to be subjected to the FEC encoding on the basis of a network transmission delay time.

15 Claims, 11 Drawing Sheets

(51) Int. Cl.
　　　*H04N 19/67*　　(2014.01)
　　　*H04N 19/89*　　(2014.01)
　　　*H04N 19/895*　　(2014.01)
　　　*H04L 1/18*　　(2006.01)

(52) U.S. Cl.
　　　CPC .......... *H04L 1/0041* (2013.01); *H04L 1/1845* (2013.01); *H04N 19/67* (2014.11)

(58) Field of Classification Search
　　　CPC ... H04L 1/0006; H04L 1/0057; H04L 1/1816; H04L 1/1877; H04L 1/0007; H04L 1/0018; H04L 1/0042; H04L 1/0045; H04L 1/0047; H04L 1/0071; H04L 65/607; H04L 1/1835; H04N 13/161; H04N 13/194; H04N 19/166; H04N 21/6373; H04N 21/6375; H04N 5/0671; H04N 19/65; H04N 19/66; H04N 19/67; H04N 19/89; H04N 19/895
　　　USPC ........ 375/240.01–240.29; 714/746, 751, 758
　　　See application file for complete search history.

(56) References Cited

U.S. PATENT DOCUMENTS

| | | | | |
|---|---|---|---|---|
| 10,104,016 B2* | 10/2018 | Takeuchi | .............. | H04L 1/0009 |
| 2006/0095942 A1* | 5/2006 | van Beek | ........... | H04N 21/2343 |
| | | | | 725/81 |
| 2006/0198325 A1* | 9/2006 | Gao | ....................... | H04L 1/0057 |
| | | | | 370/270 |
| 2007/0070995 A1* | 3/2007 | Pelletier | ................ | H04W 28/06 |
| | | | | 370/389 |
| 2007/0230349 A1* | 10/2007 | Chen | ..................... | H04L 1/0007 |
| | | | | 370/235 |
| 2008/0002580 A1* | 1/2008 | Kawada | ................ | H04L 1/0009 |
| | | | | 370/231 |
| 2010/0202309 A1 | 8/2010 | Suneya | | |
| 2011/0252287 A1 | 10/2011 | Kure | | |
| 2012/0039194 A1* | 2/2012 | Kure | ..................... | H04N 19/30 |
| | | | | 370/252 |
| 2014/0153637 A1* | 6/2014 | Imai | ....................... | H04N 19/67 |
| | | | | 375/240.02 |
| 2015/0006991 A1* | 1/2015 | Won | ................... | H04N 21/2383 |
| | | | | 714/755 |

FOREIGN PATENT DOCUMENTS

| | | |
|---|---|---|
| JP | 2011-223336 A | 11/2011 |
| JP | 2014-11670 A | 1/2014 |
| JP | 2014-99708 A | 5/2014 |

OTHER PUBLICATIONS

Written Opinion dated Aug. 2, 2016 in PCT/JP2016/063859 (with English language translation).

* cited by examiner

FIG. 8
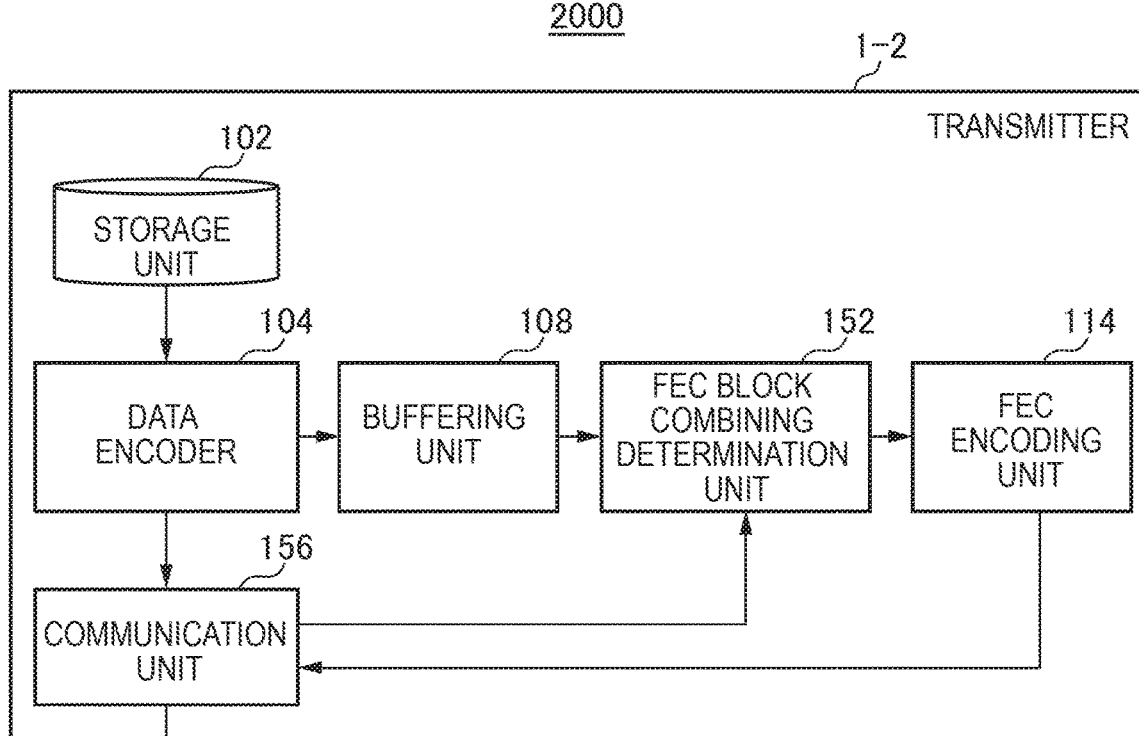
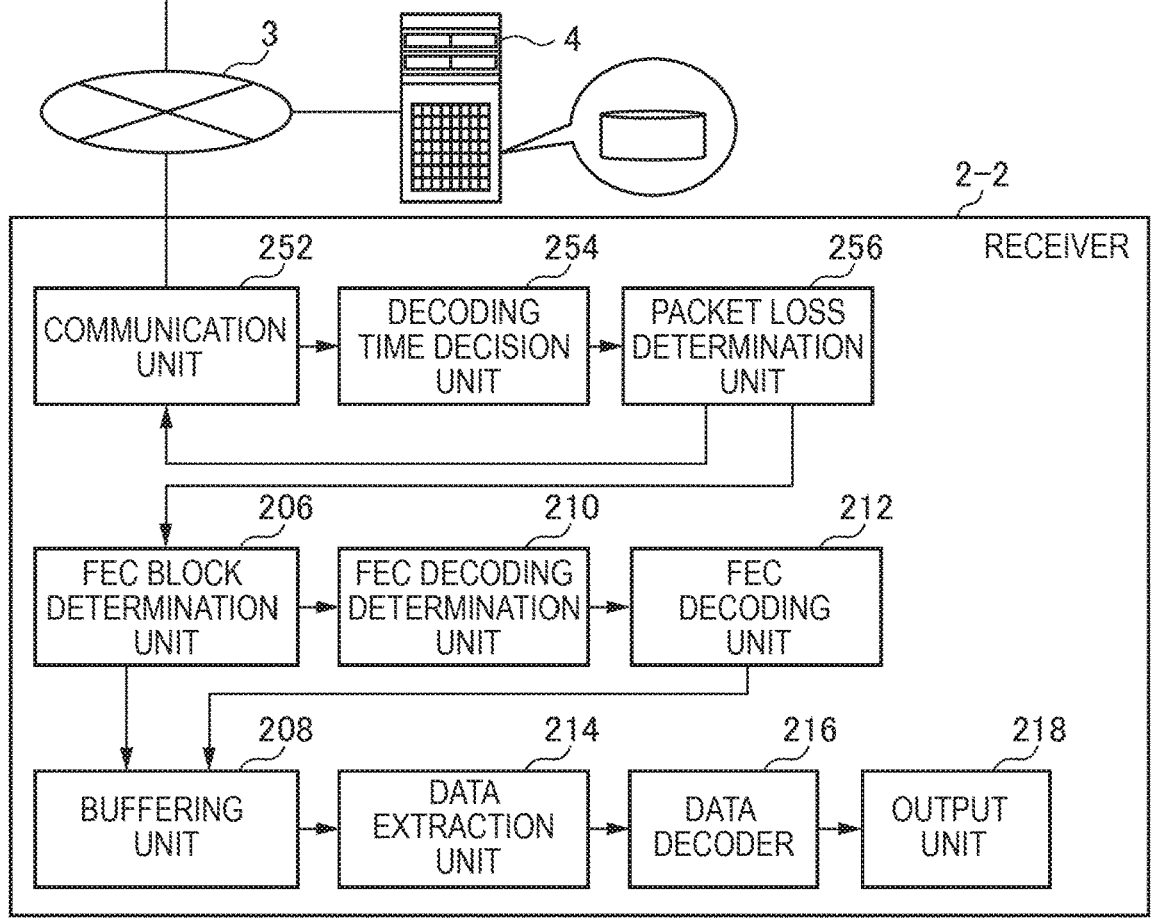

TRANSMITTER, TRANSMISSION METHOD, AND COMMUNICATION SYSTEM

CROSS REFERENCE TO RELATED APPLICATIONS

The present application is based on PCT filing PCT/JP2016/063859 filed May 10, 2016, and claims the benefit of Japanese Priority Patent Application JP 2015-122191 filed Jun. 17, 2015, the entire contents of each of which are incorporated herein by reference.

BACKGROUND

The present disclosure relates to a transmitter, a transmission method, and a communication system.

In the image (still image or moving image) transmission service such as Internet telephony or video on demand, a streaming-type transmission scheme has been recently used. In this streaming-type transmission scheme, in one example, the forward error correction (FEC) scheme that transmits a data block having a parity packet (hereinafter, is sometimes simply referred to as a parity) added thereto is used to achieve improvement in reliability of data transfer.

In the FEC scheme, in a case where loss of a packet (packet loss) occurs in a FEC block constructed by including a plurality of packets and parities, it is possible to recover the packet loss by using the parities included in the FEC block (e.g., JP 2006-217530A).

SUMMARY

However, the FEC block is constructed regardless of network conditions, and so, in one example, there is sometimes a case where the parity does not arrive at the receiver side by the time when recovery of the packet loss is necessary due to network delay and thus the packet loss fails to be recovered. In one example, in the image transmission service, an FEC block in which image data includes a plurality of frames and a parity is constructed, but there is sometimes a case where the packet loss fails to be recovered by the time when the image decoding starts depending on the number of frames included in the FEC block.

Thus, the present disclosure provides a novel and improved transmitter, transmission method, and communication system, capable of constructing an FEC block including a plurality of frames corresponding to the number of frames based on network conditions.

According to an embodiment of the present disclosure, there is provided a transmitter including: a transmission unit configured to transmit a parity packet obtained by performing FEC encoding on a plurality of frames in image data for each of the plurality of frames; and a number-of-frames specifying unit configured to specify the number of frames of the plurality of frames to be subjected to the FEC encoding on the basis of a network transmission delay time.

Further, according to an embodiment of the present disclosure, there is provided a transmission method including: transmitting a parity packet obtained by performing FEC encoding on a plurality of frames in image data for each of the plurality of frames; and specifying the number of frames of the plurality of frames to be subjected to the FEC encoding on the basis of a network transmission delay time.

There is provided a communication system including: a transmitter including a transmission unit configured to transmit a parity packet obtained by performing FEC encoding on a plurality of frames in image data for each of the plurality of frames, and a number-of-frames specifying unit configured to specify the number of frames of the plurality of frames to be subjected to the FEC encoding on the basis of a network transmission delay time; and a receiver configured to receive the parity packet and perform FEC decoding using the received parity packet.

According to an embodiment of the present disclosure as described above, it is possible to construct the FEC block including a plurality of frames corresponding to the number of frames based on network conditions.

Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 8 is a diagram illustrated to describe a configuration example of a communication system according to a second embodiment;

DETAILED DESCRIPTION OF THE EMBODIMENT(S)

Figure 1:
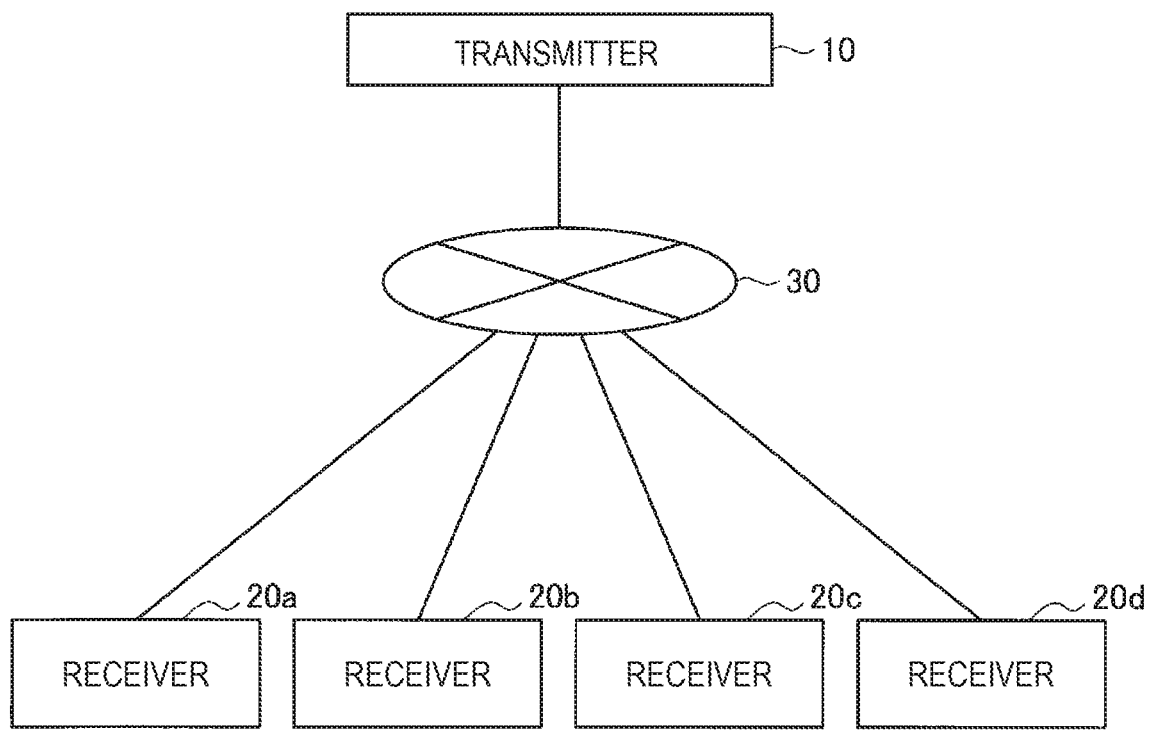
FIG. 1 is a diagram illustrated to describe an example of a communication system using a streaming-type transmission scheme employed for an image transmission service.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated description of these structural elements is omitted.

Moreover, the description will be given in the following order.

<<1. First Embodiment>>
<1-1. Background>
<1-2. Configuration of First Embodiment>
<1-3. Operation of First Embodiment>

<1-4. Effect of First Embodiment>
<<2. Second Embodiment>>
<2-1. Configuration of Second Embodiment>
<2-2. Operation of Second Embodiment>
<2-3. Effect of Second Embodiment>
<<3. Modified Example>
<<4. Hardware Configuration Example>>
<<5. Concluding Remarks>>
<<1. First Embodiment>>
<1-1. Background>

The background to the creation of a communication system according to a first embodiment of the present disclosure is described, and then the communication system according to the present embodiment is described.

A downloading-type or streaming-type transmission scheme is used, in one example, for data transmission of a packet with a restricted arrival time limit in the best-effort communication network.

In the case of the downloading-type transmission scheme, in one example, a data file is downloaded from a delivery server (transmitter) onto a recording area of a receiver side terminal (receiver). In one example, in a case where the data file is image (still image or moving image) data, the image starts to be played back at the time when transfer (downloading) of the data file is completed fully. Thus, the downloading-type transmission scheme is unsuitable for playback of data having long playback time and large size or data that necessitates real-time playback.

On the other hand, in the case of the streaming-type transmission scheme, the playback of data is started and executed using a part of data being transferred from a transmitter to a receiver. For this reason, the streaming-type transmission scheme is used for image transmission service or the like such as Internet telephony, video teleconferencing, video on demand, and network streaming service.

FIG. 1 is a diagram illustrated to describe an example of a communication system using the streaming-type transmission scheme employed for the image transmission service. The communication system illustrated in FIG. 1 includes a transmitter 10, receivers 20a to 20d, and a communication network 30.

The transmitter 10 is, in one example, a server for delivering an image, and transmits image data to the receivers 20a to 20d via the communication network 30.

The receivers 20a to 20d are, in one example, information processing devices that receive the image data transmitted by the transmitter 10 via the communication network 30 and execute playback of an image using a part of the received image data.

The communication network 30 is a wired or wireless transmission channel for information transmitted from the device connected to the communication network 30. Examples of the communication network 30 may include a public line network such as Internet, telephone line network, and satellite communication network, various local area networks (LANs) including Ethernet (registered trademark), a wide area network (WAN), or the like. In addition, an example of the communication network 30 may include a leased line network such as internet protocol-virtual private network (IP-VPN).

Moreover, although FIG. 1 illustrates an example where a plurality of receivers are present with respect to one transmitter, the communication system in the streaming-type transmission scheme may have, in some cases, one transmitter and one receiver. In addition, it is also possible to perform bidirectional streaming-type transmission between devices, each having both functions of a transmitter and a receiver.

An example of the Internet technology suitable for the streaming-type transmission scheme performed in the communication system as illustrated in FIG. 1 includes the real-time transport protocol (RTP) system specified in IETF RFC 3550. In the data transfer using the RTP system, a time stamp serving as time information is added to a packet. This makes it possible to know the temporal relationship between the transmitter side and the receiver side, thereby achieving synchronous playback without being affected by delay fluctuation (jitter) or the like at the time of packet transfer.

However, in the RTP system, the priority, settings, management, and the like of packet delivery are not provided, and so, delivery delay due to network delay or packet loss due to bandwidth shortage is likely to occur in the case of the RTP packet as with other packets. Thus, in one example, when a packet loss of about 1% or more occurs, in some cases, image distortion occurs in the receiver side or images fail to be played back.

In view of the above circumstances, in the data transmission using the RTP system, in one example, the following three techniques are available for improving reliability. The following three techniques may be used independently or in combination.

The first technique is an automatic retransmission scheme (hereinafter referred to as an automatic repeat request (ARQ) scheme) that automatically requests retransmission of a packet failed to be received due to packet loss and recovers packet loss by the retransmission.

The second technique is a forward error correction coding scheme (hereinafter referred to as forward error correction (FEC) scheme) that adds a redundant packet to data to be transmitted and recovers the packet loss by using the redundant packet.

The third technique is an automatic bandwidth control (hereinafter referred to as auto-rate control (ARC) scheme) that controls a packet to be transmitted and transmits a packet with the transmittable bandwidth or below to prevent the occurrence of packet loss.

In the communication system employed for the image transmission service as illustrated in FIG. 1, in the case of recovering the packet loss using the ARQ scheme and the FEC scheme as described above, the image data is buffered on the receiver side for a prescribed period of time and then the image is played back.

Figure 2:
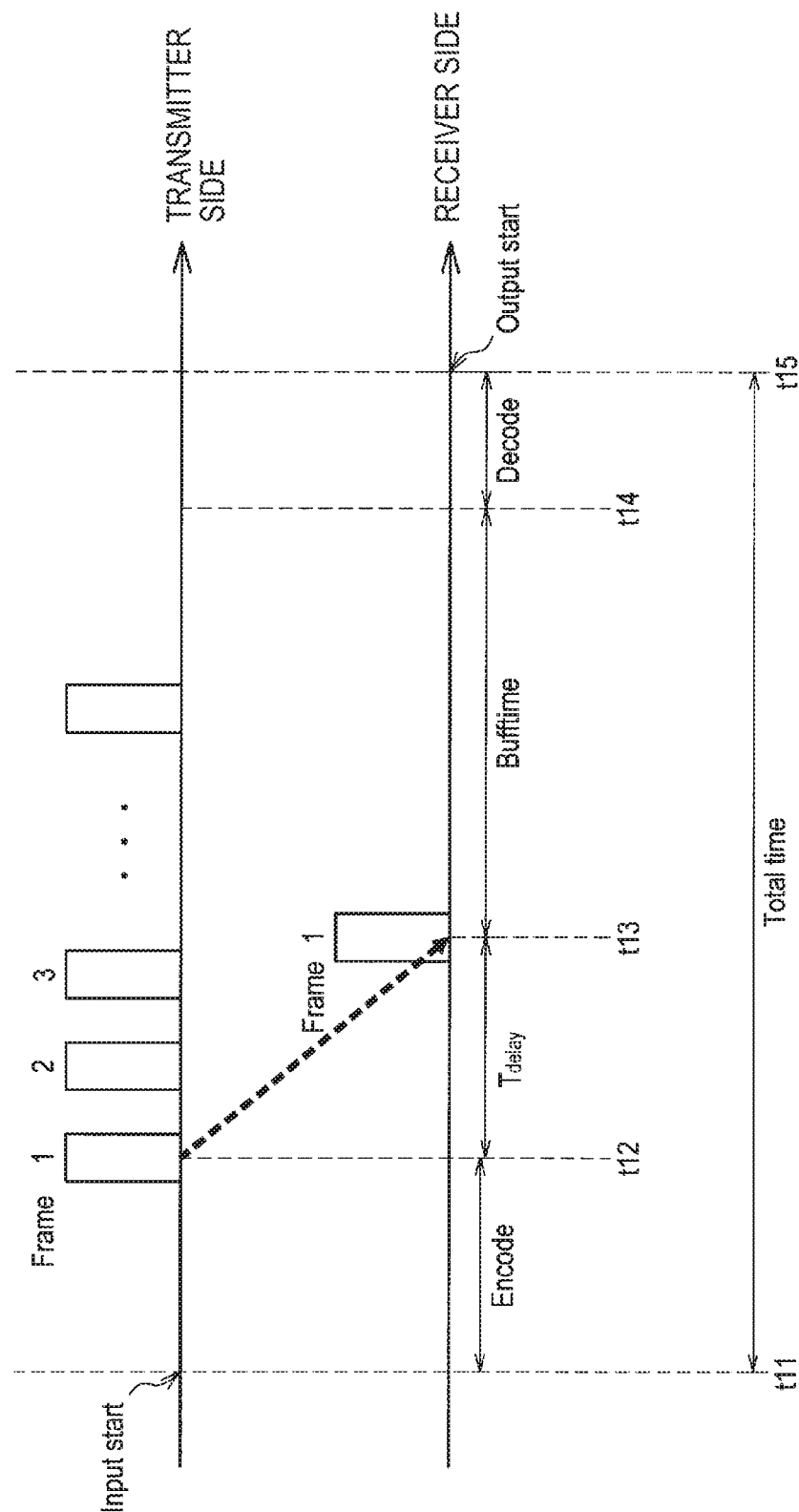
FIG. 2 is a schematic diagram illustrated to describe an operation of image transmission performed in the communication system as illustrated in FIG. 1.

FIG. 2 is a schematic diagram illustrated to describe the operation of image transmission performed in the communication system as illustrated in FIG. 1. The image data is transmitted for each frame that is a predetermined unit indicating one image as described below.

First, at time t11 illustrated in FIG. 2, the transmitter 10 starts image encoding (Encode) for converting image data into a packet. Subsequently, at time t12, a first frame data Frame1 packetized by the image encoding is transmitted from the transmitter 10 (transmitter side) to the receiver 20 (receiver side). Here, at time t13 that is delayed by time $T_{delay}$ due to network delay or the like from the time t12, the receiver side receives the first frame data Frame1. After buffering over a period of buffering time Bufftime, the receiver 20 starts image decoding (Decode) for converting a packet to image data at time t14. The image data obtained by the image decoding starts to be played back from time t15. Thus, in a case where packet loss occurs in the first frame data and the packet loss is recovered using the ARQ or FEC scheme, it is desirable to recover the packet loss during the buffering time Bufftime illustrated in FIG. 2.

Further, in the FEC scheme, the transmitter transmits a parity packet used to recover a certain number of data packets (hereinafter may be referred to as a source or a source packet) in the case where the data packet is lost. One packet group composed of a source group targeted by a parity packet (hereinafter may be simply referred to as parity) and the generated parity is called an FEC block. In one example, in the image transmission, a plurality of frames in image data are included in the FEC block, and FEC encoding (generation of parity) and FEC decoding (recovery of packet loss) are performed for each of a plurality of frames included in the FEC block. In addition, in some FEC blocks, the number of packet losses that is recoverable using the parity depends on the capability or the like of the FEC coding scheme to be used.

In a case where the burst loss occurs in the FEC block, packet losses corresponding to the number that fails to be recovered even using parity will occur in some cases. Meanwhile, in some cases, a technique called interleaving that temporally distributes burst losses by causing the transmitter side to buffer data for a certain period of time and to transmit it with the changed order and by causing the receiver side restores the transmission order to the original. This makes it possible to distribute the loss occurring in each FEC block, which leads to the effective use of the parity.

However, in the case where the interleaving is used, the transmission buffering time and the reception buffering time becomes longer, which deteriorates significantly the real-time performance in some cases.

In view of the above circumstances, related techniques for handling burst loss while maintaining the real-time performance to some extent by increasing the number of sources included in the FEC block, constructing a large FEC block, and extending the range of a source associated with parity have been developed.

However, in the related techniques, the number of sources included in the FEC block is decided without considering network conditions. Thus, in one example, in a case where packet loss and an unexpected network delay occur, the parity does not arrive by the time necessary for the receiver to recover the packet loss (image decoding start time), and so the packet loss is likely to fail to be recovered. In addition, when the frame rate or the number of data packets to be transmitted is changed using ARC, the arrival of parity is delayed and so packet loss is likely to fail to be recovered, or unnecessary zero padding is likely to be performed to support the variable bit rate (VBR). An example of the operation in the case where the packet loss occurs in the related art is described below with reference to FIGS. 3 and 4.

Figure 3:
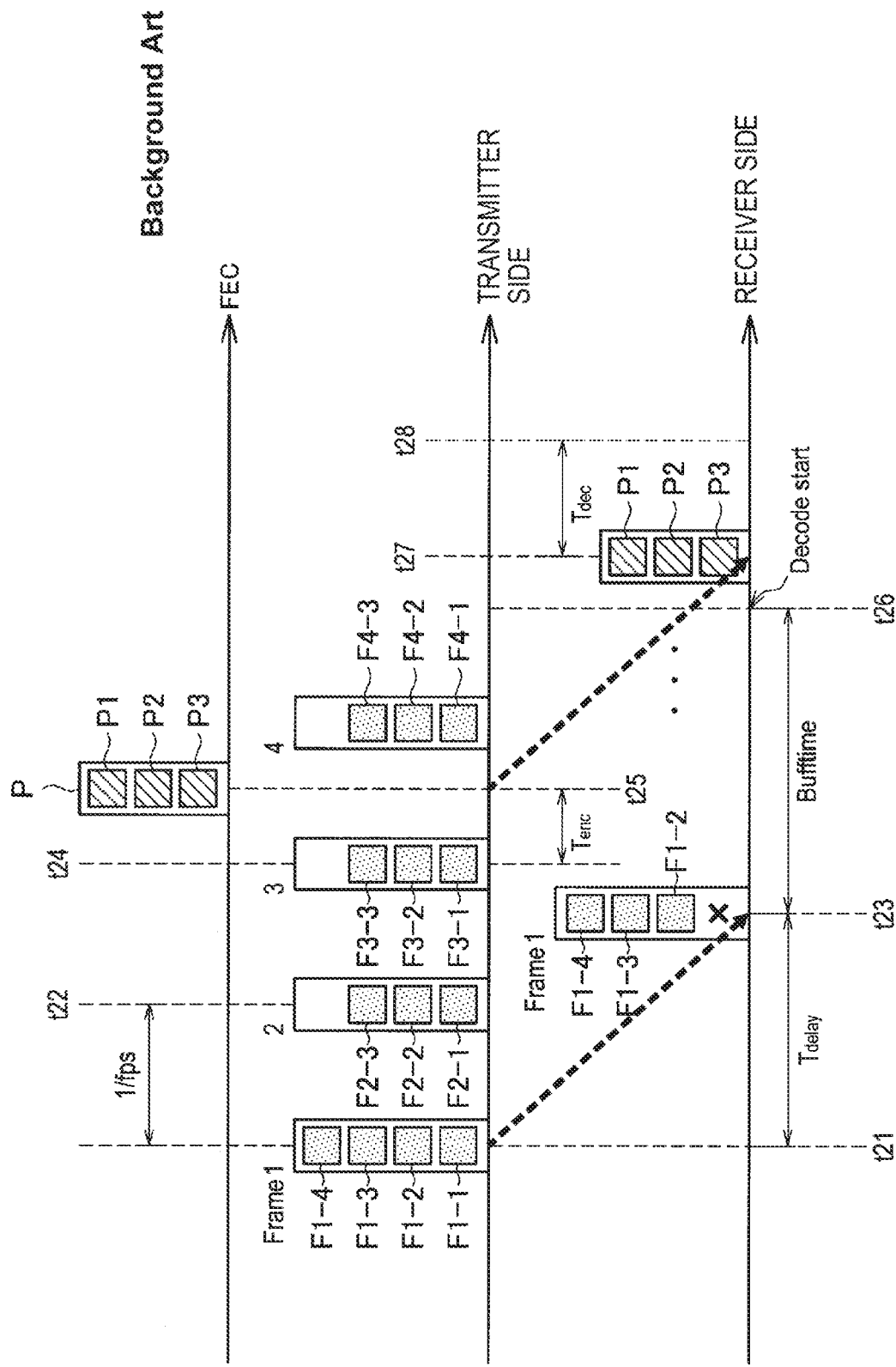
FIG. 3 is a schematic diagram illustrated to describe an example of an operation in the case where packet loss occurs in the related art of the present disclosure.

FIG. 3 is a schematic diagram illustrated to describe an example of the operation in the case where the packet loss occurs in the related art. In the example illustrated in FIG. 3, it is assumed that the source data included in one FEC block are three frame data Frame1 to Frame3 and a change in the frame rate or the like using ARC is not performed in this interval.

First, at time t21, the first frame data Frame1 is divided into packets F1-1 to F1-4 that are transmitted from the transmitter side to the receiver side. At time t22 that is delayed by reciprocal time (1/fps) of the frame rate from the time t21, a second frame data Frame2 starts to be transmitted from the transmitter side to the receiver side. In addition, at time t24 that is delayed by reciprocal time (not shown) of the frame rate from the time t22, similarly, a third frame data Frame3 starts to be transmitted from the transmitter side to the receiver side. After the third frame data Frame3 is transmitted at time t24, the first to third frame data Frame1 to Frame3 are subjected to the FEC encoding to generate a parity P. Then, at time t25 that is delayed by FEC encoding time $T_{enc}$ from time t24, the parity P is divided into parity packets P1 to P3 that are transmitted from the transmitter side to the receiver side. Moreover, in the example of FIG. 3, each of the parity packets P1 to P3 is a parity packet that is capable of recovering the packet losses of the source packets included in the FEC block one by one.

On the other hand, the first frame data Frame1 transmitted from the transmitter side is received by the receiver side at time t23 that is delayed by time $T_{delay}$ from the time t21. Here, as illustrated in FIG. 3, the packet F1-1 in the first frame data Frame1 is lost (packet loss). As illustrated in FIG. 3, the first frame data Frame1 starts to be subjected to the image decoding at time t26 that is delayed by the buffering time Bufftime from time t23, and so it is desirable to recover the packet F1-1 by time t26. However, as illustrated in FIG. 3, the parity P transmitted at time t25 arrives at the receiver side at time t27 due to the influence of network delay or the like. Further, the FEC decoding (recovery of packet loss using parity) is necessary to take FEC decoding time $T_{dec}$. Thus, the packet F1-1 is not recovered before time t28 illustrated in FIG. 3, and the packet F1-1 is not recovered at the image decoding start time t26, so the first frame of the image data is not normally played back in some cases.

Figure 4:
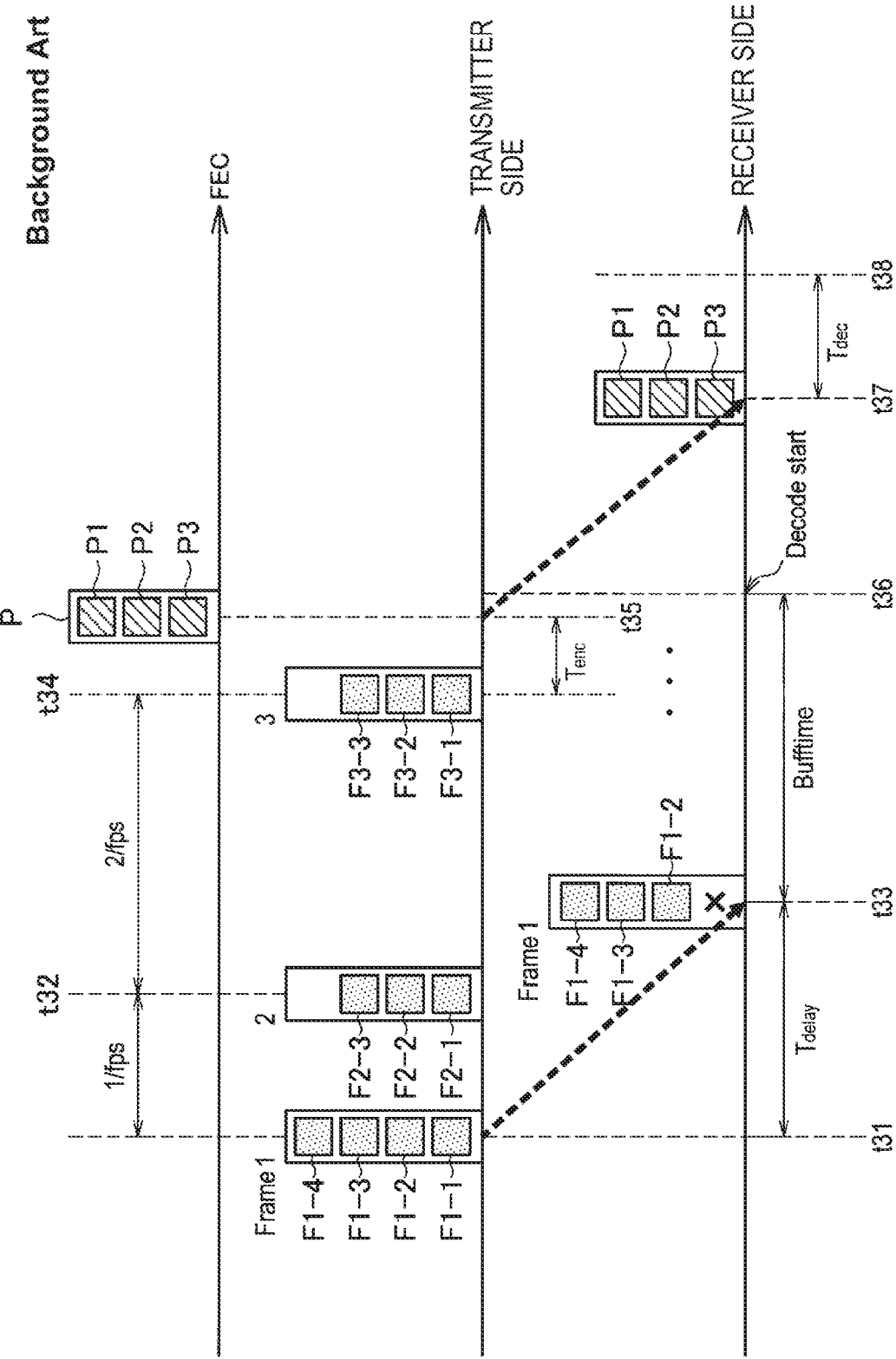
FIG. 4 is a schematic diagram illustrated to describe another example of the operation in the case where packet loss occurs in the related art of the present disclosure.

Subsequently, an example of the operation of the related art in the case where the frame rate is changed using ARC is described with reference to FIG. 4. FIG. 4 is a schematic diagram illustrated to describe another example of the operation in the case where the packet loss occurs in the related art. In the example illustrated in FIG. 4, the source data included in one FEC block is three frame data Frame1 to Frame3, which is similar to the example of FIG. 3, but the frame rate is changed using ARC in the interval, which is different from the example of FIG. 3.

First, at time t31, a first frame data Frame1 is divided into packets F1-1 to F1-4 that are transmitted from the transmitter side to the receiver side. A second frame data Frame2 starts to be transmitted from the transmitter side to the receiver side at time t32 that is delayed by reciprocal time (1/fps) of the frame rate from time t31. Here, the control using ARC is performed, and the frame rate is changed to a frame rate that is half of the frame rate fps at time t31. Thus, a third frame data Frame3 starts to be transmitted from the transmitter side to the receiver side at time t34 that is delayed by reciprocal time (2/fps) of the changed frame rate from the time t32. After the third frame data Frame3 is transmitted at time t34, the first to third frame data Frame1 to Frame3 are subjected to the FEC encoding to generate the parity P. Then, at time t35 that is delayed by the FEC encoding time $T_{enc}$ from time t34, the parity P is divided into parity packets P1 to P3 that are transmitted from the transmitter side to the receiver side.

On the other hand, the first frame data Frame1 transmitted from the transmitter side is received by the receiver side at time t3 that is delayed by time $T_{delay}$ from time t31. Here, as illustrated in FIG. 4, the packet F1-1 in the first frame data Frame1 is lost (packet loss). As illustrated in FIG. 4, the first frame data Frame1 starts to be subjected to the image decoding at time t36 that is delayed by the buffering time Bufftime from the time t33, and so it is desirable to recover the packet F1-1 by time t36. However, as illustrated in FIG. 4, the parity packets P1 to P3 transmitted at time t35 arrive at the receiver side at time t37 due to the influence of network delay or the like. Further, the FEC decoding (recovery of packet loss using parity) is necessary to take the FEC decoding time $T_{dec}$. Thus, the packet F1-1 is not recovered before time t38 illustrated in FIG. 4, and the recovery of the packet F1-1 is not in time for the image decoding start time t36, so the first frame of the image data is not normally played back in some cases. In addition, in comparison of FIG. 4 and FIG. 3, the frame rate is changed using ARC in the example of FIG. 4, and so the arrival time of each of the parity packets P1 to P3 is even later than that in the example of FIG. 3. Thus, the image data is less likely to be played back normally.

Thus, the present embodiment has been conceived by focusing on the above circumstances. According to the present embodiment, the construction of the FEC block including a plurality of frames corresponding to the number of frames based on network conditions makes it possible to prevent the occurrence an event in which the packet loss fails to be recovered in time by the image decoding start time. The configuration and operation of the communication system according to the present embodiment having such effects are described below sequentially in detail.

<1-2. Configuration of First Embodiment>

Figure 5:
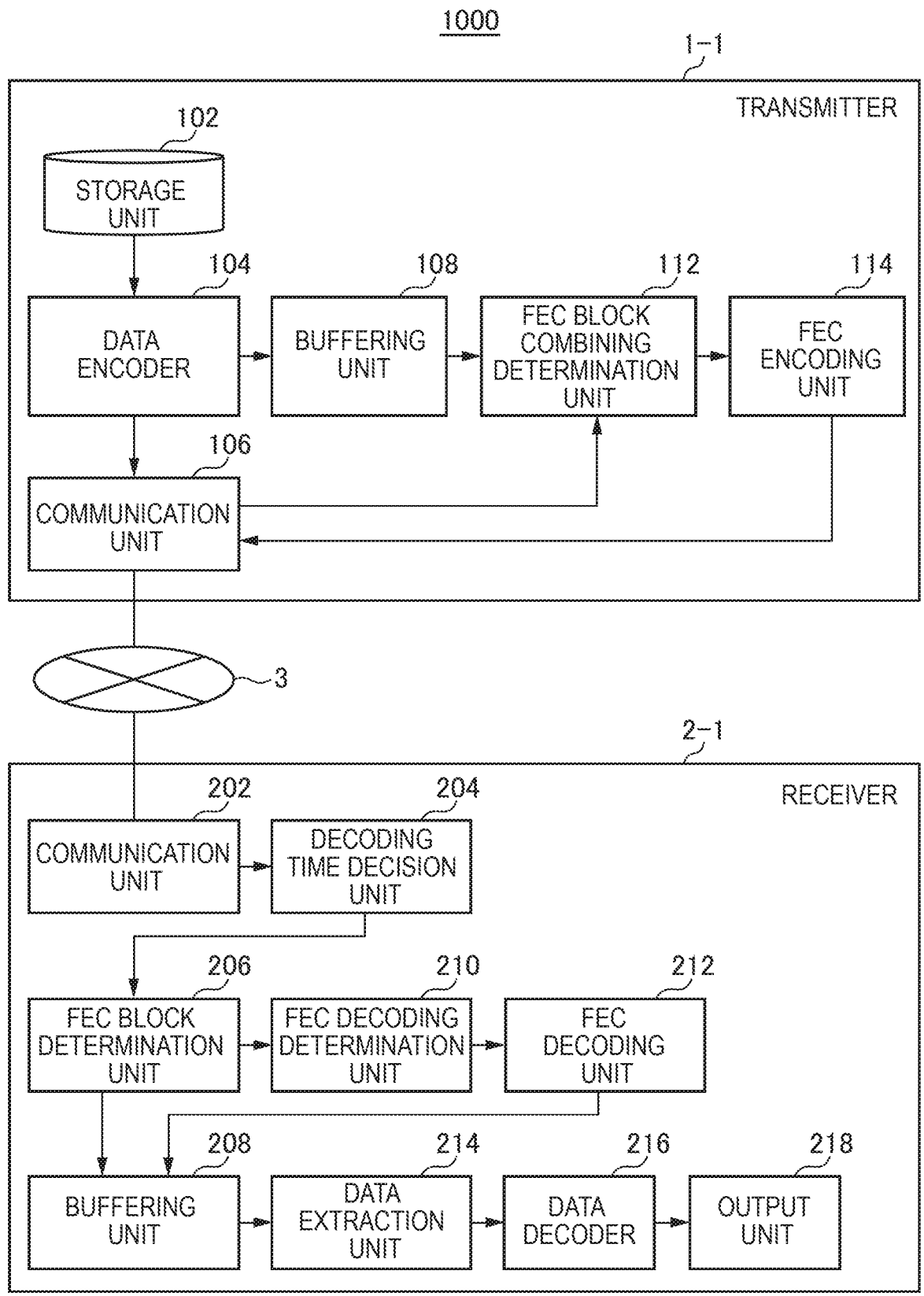
FIG. 5 is a diagram illustrated to describe a configuration example of a communication system according to a first embodiment.

The background to the creation of the communication system according to the present embodiment is described above. Subsequently, the configuration of the communication system according to the present embodiment is described with reference to FIGS. 5 and 6. FIG. 5 is a diagram illustrated to describe an example of the configuration of the communication system according to the first embodiment. As illustrated in FIG. 5, in one example, a communication system 1000 according to the present embodiment has a transmitter 1-1, a receiver 2-1, and a communication network 3. The communication network 3 has substantially the same configuration as that of the communication network 30 described with reference to FIG. 1, and so description thereof is omitted.

The communication system 1000 illustrated in FIG. 5 is a communication system based on the streaming-type transmission scheme for image transmission, which is similar to the communication system described with reference to FIG. 1. In addition, in the present embodiment, the buffering time in the receiver 2-1 is assumed to be a fixed value (e.g., a value set by the user).

As illustrated in FIG. 5, the transmitter 1-1 includes a storage unit 102, a data encoder 104, a communication unit 106, a buffering unit 108, an FEC block combining determination unit 112, and an FEC encoding unit 114. The configuration of the transmitter 1-1 is described, and then the configuration of the FEC block combining determination unit 112 included in the transmitter 1-1 is described in detail with reference to FIG. 6.

The storage unit 102 stores image data. The image data stored in the storage unit 102 is converted into a packet (image encoding) by the data encoder 104.

The communication unit 106 transmits a plurality of frames in the image data converted into a packet by the data encoder 104 to the receiver 2-1. In addition, the communication unit 106 has a function as a transmission unit that transmits a parity packet received from the FEC encoding unit 114 to be described later to the receiver 2-1 for each of the plurality of frames to be subjected to the FEC encoding. In addition, the communication unit 106 receives statistical information, such as information on transmission delay time or information on time necessary for the FEC decoding in the receiver 2-1, and supplies it to FEC block combining determination unit 112, in accordance with the real-time transport control protocol (RTCP).

The buffering unit 108 buffers the image data converted into a packet by the data encoder 104. The FEC block combining determination unit 112 determines whether the image data buffered in the buffering unit 108 is possible to be combined. The configuration of the FEC block combining determination unit 112 will be described later. The FEC encoding unit 114, when receiving an instruction from the FEC block combining determination unit 112, performs the FEC encoding on a plurality of frames in the image data corresponding to the number of frames specified by the FEC block combining determination unit 112.

Figure 6:
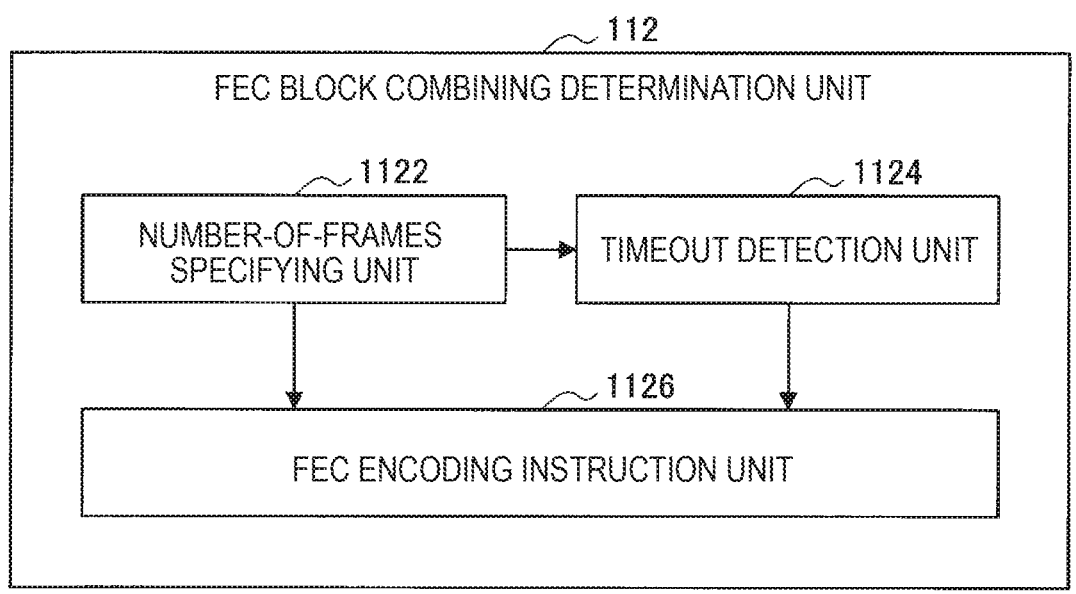
FIG. 6 is a diagram illustrated to describe a configuration of an FEC block combining determination unit according to the present embodiment.

The configuration of the transmitter 1-1 is described above. Subsequently, the configuration of the FEC block combining determination unit 112 included in the transmitter 1-1 is described in detail with reference to FIG. 6. FIG. 6 is a diagram illustrated to describe the configuration of the FEC block combining determination unit 112 according to the present embodiment.

As illustrated in FIG. 6, the FEC block combining determination unit 112 according to the present embodiment includes a number-of-frames specifying unit 1122, a timeout detection unit 1124, and an FEC encoding instruction unit 1126.

The number-of-frames specifying unit 1122 specifies the number of frames of a plurality of frames to be subjected to the FEC encoding on the basis of the network transmission delay time necessary for network transmission. In one example, the number of frames specified by the number-of-frames specifying unit 1122 is preferably set to the number of frames such that the reception of parity packet and the FEC decoding are completed before the buffering time in the receiver 2-1 elapses after the receiver 2-1 receives the first frame among the plurality of frames. The number of frames as described above may be referred to as an allowable number of frames in some cases. This configuration allows the packet loss to be recovered by receiving the parity packet and performing FEC decoding before the time when the image decoding starts even if the packet loss occurs in the packet of the first frame.

Further, the time necessary for the FEC processing varies depending on the FEC scheme, the processing performance of each of the transmitter 1-1 and the receiver 2-1, or the like. Thus, the allowable number of frames as described above is preferably specified on the basis of the time necessary for the FEC processing to specify the allowable number of frames with higher accuracy. In one example, the number-of-frames specifying unit 1122 specifies the number of frames as described above further on the basis of the FEC encoding time necessary for FEC encoding, the FEC decoding time necessary for FEC decoding in the receiver 2-1, and the buffering time in the receiver 2-1. This configuration makes it possible to construct an FEC block including a plurality of frames corresponding to the number of frames based on the processing time necessary for the FEC processing in the transmitter 1-1 and the receiver 2-1 in addition to the network conditions.

Further, the number-of-frames specifying unit 1122 may use a maximum value of the time necessary for FEC encoding in the previous predetermined interval as the FEC encoding time, and may use a maximum value of the time necessary for FEC decoding in the previous predetermined interval as the FEC decoding time. The previous predetermined interval may be, in one example, an interval from the predetermined time before the present to the present, or an interval from the start of communication to the present. This configuration allows the packet loss to be recovered by the reception of the parity packet and the FEC decoding before the time when the image decoding starts even if the maximum value in the predetermined interval is set as each of the FEC encoding time and the FEC decoding time.

The timeout detection unit 1124 detects a timeout in a case where a standby time for the FEC encoding to start reaches a limit standby time. The limit standby time is preferably set so that the packet loss is recovered before the time when the image decoding starts by causing the FEC encoding to start at the time of the detection of a timeout even if the packet loss occurs in the packet of the first frame.

An example of the available limit standby time may include a predetermined time, a frame combinable time (described later) specified by the number-of-frames specifying unit 1122, and a time specified on the basis of the frame combinable time. Moreover, the frame combinable time may be specified on the basis of the FEC encoding time necessary for FEC encoding, the FEC decoding time necessary for FEC decoding of the parity packet in the receiver 2-1, and the buffering time in the receiver 2-1, as described later.

The FEC encoding instruction unit 1126 monitors the frame stored in the buffering unit 108, and instructs the FEC encoding unit 114 to perform the FEC encoding in the case where the number of frames being monitored reaches the number of frames specified by the number-of-frames specifying unit 1122.

Further, in the case where the timeout detection unit 1124 detects a timeout, the FEC encoding instruction unit 1126 instructs the FEC encoding unit 114 to perform FEC encoding. Thus, in the case where the timeout detection unit 1124 detects the timeout, the FEC encoding unit 114 performs FEC encoding on a plurality of frames whose number is smaller than the number of frames specified by the number-of-frames specifying unit 1122.

This configuration allows FEC encoding to start so that packet loss is recovered before the time when image decoding starts, regardless of the number of frames specified by the number-of-frames specifying unit 1122. Thus, in one example, even when the frame rate or the number of transmission data packets changes using ARC, the packet loss is recovered before the time when image decoding starts.

The configurations of the transmitter 1-1 and the FEC block combining determination unit 112 included in the transmitter 1-1 according to the present embodiment are described above. Subsequently, referring back to FIG. 5, the configuration of the receiver 2-1 according to the present embodiment is described. As illustrated in FIG. 5, the receiver 2-1 according to the present embodiment includes a communication unit 202, a decoding time decision unit 204, an FEC block determination unit 206, a buffering unit 208, an FEC decoding determination unit 210, an FEC decoding unit 212, a data extraction unit 214, a data decoder 216, and an output unit 218.

The communication unit 202 receives the packetized image data of a plurality of frames and the parity packet transmitted from the transmitter 1-1. In addition, the communication unit 202 transmits and receives statistical information, such as information on transmission delay time or information on time necessary for FEC decoding in the receiver 2-1 in accordance with the real-time transport control protocol (RTCP).

The decoding time decision unit 204 decides the decoding time (buffering time) of each packet on the basis of the time stamp of the packet received by the communication unit 202.

The FEC block determination unit 206 determines to which FEC block the packet belongs on the basis of the header information included in the packet. In the buffering unit 208, the packet received by the communication unit 202 is buffered (accumulated). In addition, in the buffering unit 208, a packet recovered from the packet loss, which is supplied from the FEC decoding unit 212 to be described later, is buffered.

In the case where the packet loss occurs in the FEC block, the FEC decoding determination unit 210 determines whether the packet loss is recoverable by FEC decoding. In one example, the FEC decoding determination unit 210 may perform the determination based on the determination by the FEC block determination unit 206, the number of packets of the source (image data) normally received in the FEC block, and the number of packets of the parity.

In the case where the FEC decoding determination unit 210 determines that the packet loss is recoverable, the FEC decoding unit 212 performs FEC decoding on the source and the parity packet received by the communication unit 202 and recovers the packet loss. In addition, the FEC decoding unit 212 supplies the packet obtained (recovered) by FEC decoding to the buffering unit 208.

The data extraction unit 214 extracts the packet that reaches the decoding time (buffering time) decided by the decoding time decision unit 204 from the buffering unit 208, and supplies the extracted packet to the data decoder 216. The data decoder 216 performs image decoding on the packet supplied from the data extraction unit 214 to obtain image data before packetizing. The output unit 218 outputs (e.g., plays back) the image data obtained by the data decoder 216.

<1-3. Operation of First Embodiment>

Figure 7:
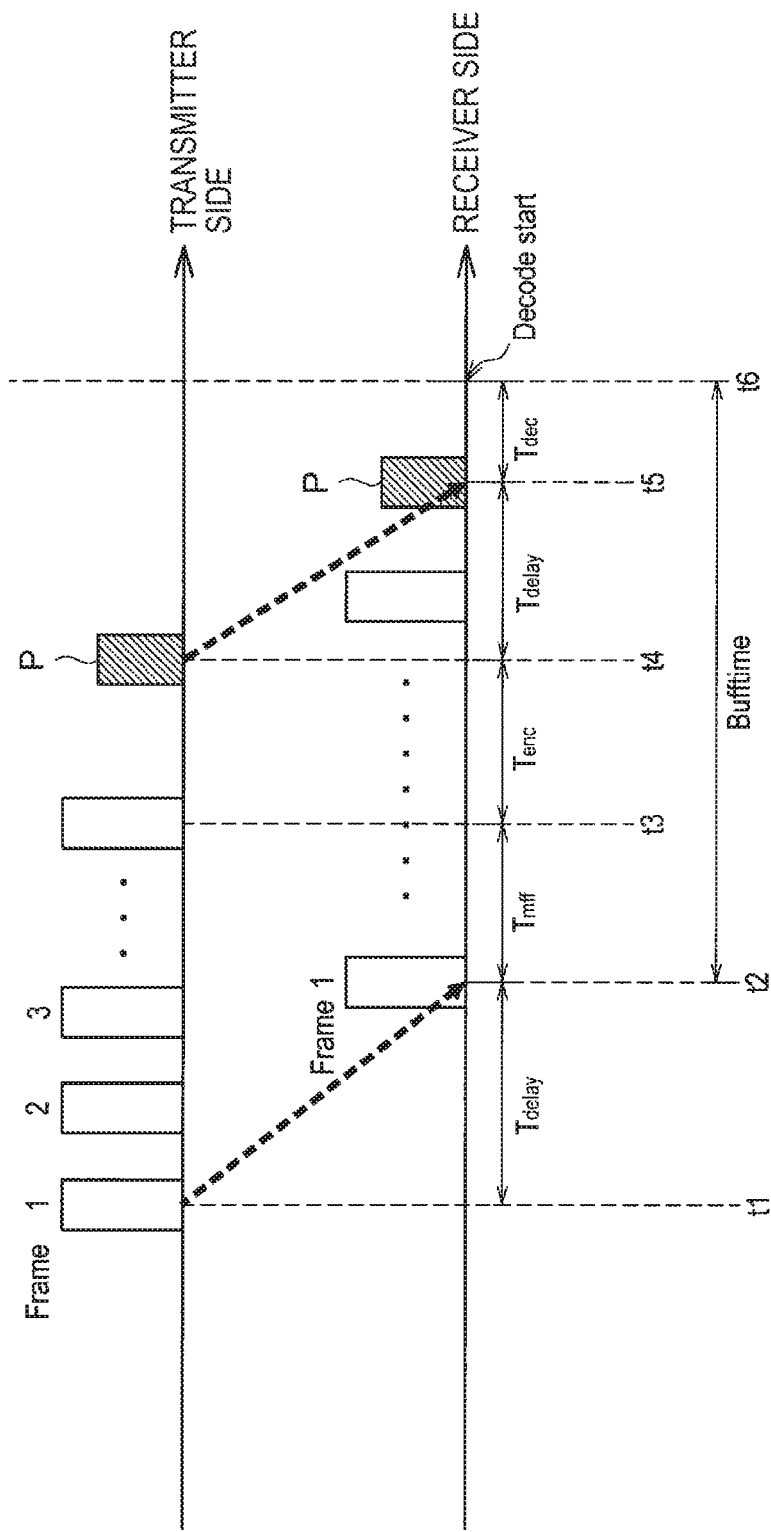
FIG. 7 is a schematic diagram illustrated to describe image transmission by the communication system according to the present embodiment.

The configuration example of the transmitter 1-1 and the receiver 2-1 included in the communication system 1000 according to the first embodiment of the present disclosure is described above. Subsequently, with reference to FIG. 7, an operation example of the communication system 1000 according to the present embodiment is described, particularly focusing on the operation of the number-of-frames specifying unit 1122. FIG. 7 is a schematic diagram illustrated to describe image transmission performed by the communication system 1000 according to the present embodiment.

First, at time t1, a first frame data Frame1 is transmitted from the transmitter side (transmitter 1-1) to the receiver side (receiver 2-1). The first frame data Frame1 arrives at the receiver side at time t2 that is delayed by time $T_{delay}$ due to the influence of network delay or the like from time t1. The buffering unit 208 of the receiver 2-1 buffers the first frame data Frame1 during the buffering time Bufftime in the receiver 2-1 from time t2 to time t6. Then, the data decoder 216 of the receiver 2-1 starts the image decoding on the first frame data Frame1.

Further, as illustrated in FIG. 7, an FEC encoding time $T_{enc}$ is taken before the parity P is generated after the FEC encoding instruction is issued. A time $T_{delay}$ is taken before the parity P arrives at the receiver side after transmission from the transmitter side. Further, as illustrated in FIG. 7, a time $T_{dec}$ is taken before FEC decoding is performed after the parity P arrives at the receiver side. Thus, if FEC encoding starts before a frame combinable time $T_{mff}$ elapses as illustrated in FIG. 7, the reception of the parity P and the FEC decoding can be completed before the buffering time Bufftime elapses.

Here, $T_{delay}$ is expressed using the network transmission delay time (round trip time: RTT) and the maximum value $T_{Shp}$ of the packet transmission delay time occurring on the transmitter side due to smoothing of the transmission packet in the previous predetermined interval as the following formula.

$$T_{delay} = \frac{RTT}{2}(1+\alpha) + T_{shp} \quad (1)$$

Moreover, in the mathematical Formula (1), a is an offset term of the network transmission delay time RTT in a network (e.g., a wireless communication network or the like) in which uplink and downlink transmission bands are different.

Thus, from FIG. 7, the frame combinable time $T_{mff}$ and an allowable number of frames $F_{allow}$ satisfy the following mathematical formulas. Moreover, in the following formulas, $T_{enc}$ is the maximum value of time necessary for FEC encoding in the previous predetermined interval, $T_{dec}$ is the maximum value of time necessary for FEC decoding in the previous predetermined interval, and Fps is the frame rate.

$$T_{mff} = Bufftime - \frac{RTT}{2}(1+\alpha) - T_{enc} - T_{dec} - T_{shp} \quad (2)$$

$$F_{allow} \leq Fps * T_{mff} \quad (3)$$

As described above, the number-of-frames specifying unit 1122 of the transmitter 1-1 may calculate, in one example, the maximum allowable number of frames $F_{allow}$ that satisfies mathematical Formula (3), which may be the number of frames to be specified. This configuration makes it possible, even when the packet loss occurs, to expand the range of the source corresponding to the parity to the maximum (to improve the packet recovery performance) under the condition that the packet loss is recoverable before the time when the image decoding starts.

<1-4. Effect of First Embodiment>

The first embodiment is described above. The present embodiment makes it possible to recover the packet loss before the time when the image decoding starts by constructing an FEC block including a plurality of frames whose number corresponds to the number of frames based on network conditions. In addition, the packet loss is recovered before the time when the image decoding starts by starting FEC encoding as an exception at the time when the timeout is detected, even if the frame rate or the number of transmission data packets is changed using ARC.

<<2. Second Embodiment>>

In the first embodiment described above, the example in which the buffering time in the receiver is a fixed value is described. On the other hand, an example of a communication system for updating the buffering time in the receiver on the basis of burst loss information or the like is described as a second embodiment below. The communication system according to the second embodiment makes it possible to reduce the buffering time and Total time in FIG. 2 as compared with the case of using the fixed buffering time thereby further enhancing the real-time performance by updating the buffering time in the receiver. The configuration and operation of the second embodiment that achieves the above-described effect are described sequentially in detail below.

<2-1. Configuration of Second Embodiment>

The communication system according to the second embodiment of the present disclosure is a communication system using the streaming-type transmission scheme for image transmission, which is similar to the communication system 1000 according to the first embodiment. In addition, the communication system according to the second embodiment of the present disclosure has a similar configuration in part to the communication system 1000 according to the first embodiment described with reference to FIGS. 5 and 6, and so the description thereof is omitted as appropriate. The configuration of the communication system according to the second embodiment is described below with reference to FIGS. 8 and 9.

FIG. 8 is a diagram illustrated to describe a configuration example of the communication system according to the present embodiment. As illustrated in FIG. 8, the communication system 2000 according to the present embodiment is configured, in one example, to include a transmitter 1-2, a receiver 2-2, a communication network 3, and a database server 4. The communication network 3 illustrated in FIG. 8 has substantially the same configuration as that of the communication network 30 described with reference to FIG. 1, and so description thereof is omitted.

As illustrated in FIG. 8, the transmitter 1-2 includes a storage unit 102, a data encoder 104, a communication unit 156, a buffering unit 108, an FEC block combining determination unit 152, and an FEC encoding unit 114. The storage unit 102, the data encoder 104, the buffering unit 108, and the FEC encoding unit 114 illustrated in FIG. 8 have substantially the same configuration as that of the storage unit 102, the data encoder 104, the buffering unit 108, and the FEC encoding unit 114 described with reference to FIG. 5, respectively. Thus, description thereof is omitted.

The communication unit 156 transmits a plurality of frames in the image data converted into a packet by the data encoder 104 to the receiver 2-2. In addition, the communication unit 156 has a function as a transmission unit that transmits a parity packet received from the FEC encoding unit 114 to the receiver 2-2 for each of a plurality of frames to be subjected to FEC encoding. In addition, the communication unit 156 receives statistical information such as information on transmission delay time, network loss rate, and information on time necessary for FEC decoding in the receiver 2-2 in accordance with the real-time transport control protocol (RTCP), and supplies the statistical information to the FEC block combining determination unit 152. In addition, the communication unit 156 transmits statistical information such as the FEC encoding time necessary for FEC encoding by RTCP. In addition, the communication unit 156 receives burst loss information or information, such as FEC encoding time and maximum value of FEC decoding time stored in the database server 4, from the database server 4 to be described later, and supplies it to the FEC block combining determination unit 152. In addition, the communication unit 156 has a function as a transmission unit that receives a new buffering time in the receiver 2-2, which is specified by a buffering time specifying unit (described later) of the FEC block combining determination unit 152, and transmits the new buffering time to the receiver 2-2.

The FEC block combining determination unit 152 determines whether an FEC block is possible to be combined and instructs the FEC encoding unit 114 to perform FEC encoding. In addition, the FEC block combining determination unit 152 specifies a new buffering time in the receiver 2-2 and supplies it to the communication unit 156. The configuration of the FEC block combining determination unit 152 is described in detail below with reference to FIG. 9.

Figure 9:
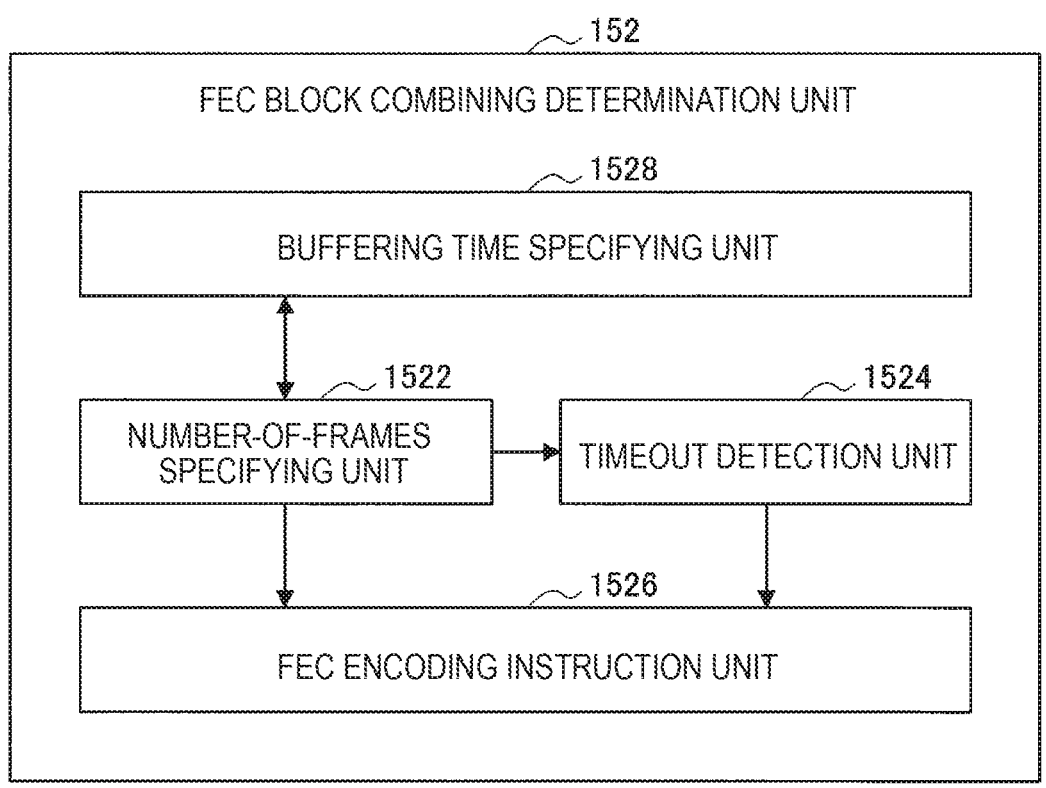
FIG. 9 is a diagram illustrated to describe a configuration of an FEC block combining determination unit according to the present embodiment.

FIG. 9 is a diagram illustrated to describe a configuration of the FEC block combining determination unit 152 according to the present embodiment. As illustrated in FIG. 9, the FEC block combining determination unit 152 according to the present embodiment includes a number-of-frames specifying unit 1522, a timeout detection unit 1524, an FEC encoding instruction unit 1526, and a buffering time specifying unit 1528. The timeout detection unit 1524 and the FEC encoding instruction unit 1526 have substantially the same configuration as that of the timeout detection unit 1124 and the FEC encoding instruction unit 1126 described with reference to FIG. 6, respectively, and so description thereof is omitted.

The number-of-frames specifying unit 1522 specifies the number of frames of a plurality of frames to be subjected to FEC encoding, which is similar to the number-of-frames specifying unit 1122 described with reference to FIG. 6. The number-of-frames specifying unit 1522 specifies the number of frames on the basis of the burst loss information, in addition to the information used to specify the number of frames by the number-of-frames specifying unit 1122 described with reference to FIG. 6. The burst loss information is information on the burst loss supplied from the database server 4 described later, and may be, in one example, the maximum value of the number of consecutive losses (the number of losses) in the previous predetermined interval. This configuration makes it possible to specify the number of frames (such number of frames is sometimes referred to as the requested number of frames, hereinafter), which is necessary to obtain the number of parities (depending on FEC scheme) that is capable of recovering the number of occurring losses.

The buffering time specifying unit 1528 specifies a new buffering time in the receiver 2-2 using the number of frames, which is specified on the basis of the burst loss information by the number-of-frames specifying unit 1522. This configuration makes it possible, in one example, to specify the buffering time so that the buffering time in the receiver 2-2 is to reduce while obtaining the number of parities that is capable of recovering the number of occurring losses.

The configuration of the transmitter 1-2 and the FEC block combining determination interval 152 included in the transmitter 1-2 according to the present embodiment is described above. Subsequently, referring back to FIG. 8, the configuration of the receiver 2-2 according to the present embodiment is described. As illustrated in FIG. 8, the receiver 2-2 according to the present embodiment includes a communication unit 252, a decoding time decision unit 254, a packet loss determination unit 256, an FEC block determination unit 206, a buffering unit 208, an FEC decoding determination unit 210, an FEC decoding unit 212, a data extraction unit 214, a data decoder 216, and an output unit 218. The configuration of each unit other than the communication unit 252, the decoding time decision unit 254, and the packet loss determination unit 256 from among the units included in the receiver 2-2 illustrated in FIG. 8 is substantially the same as the configuration of each unit with the same reference numeral as described with reference to FIG. 5. Thus, description thereof is omitted.

The communication unit 252 receives the packetized image data of a plurality of frames and the parity packet transmitted from the transmitter 1-2. In addition, the communication unit 252 transmits and receives statistical information such as information on transmission delay time and information on time necessary for FEC decoding in the receiver 2-2 in accordance with the real-time transport control protocol (RTCP). In addition, the communication unit 252 supplies the database server 4 with the burst loss information supplied by the packet loss determination unit 256 described later. In addition, the communication unit 252 receives the buffering time from the transmitter 1-2.

The decoding time decision unit 254 decides (updates) the decoding time (buffering time) of each packet on the basis of the time stamp of the packet received via the communication unit 252 and the buffering time received via the communication unit 252 from the transmitter 1-2 for each packet.

The packet loss determination unit 256 determines whether the packet loss occurs. If the packet loss is occurs, the packet loss determination unit 256 transmits packet loss information (e.g., the number of consecutively occurring packet losses) to the communication unit 252.

The database server 4 is a server that receives the packet loss information (the number of consecutive losses) from the receiver 2-2 and stores it. In addition, the database server 4 stores statistical information, such as FEC encoding time, FEC decoding time, transmission delay time, and packet transmission delay time occurring on the transmitter side due to smoothing of transmission packets. The statistical information is shared by RTCP. In addition, in the case where the above information exceeds the maximum value of the stored information, the database server 4 supplies the information to the transmitter 1-2.

<2-2. Operation of Second Embodiment>

Figure 10:
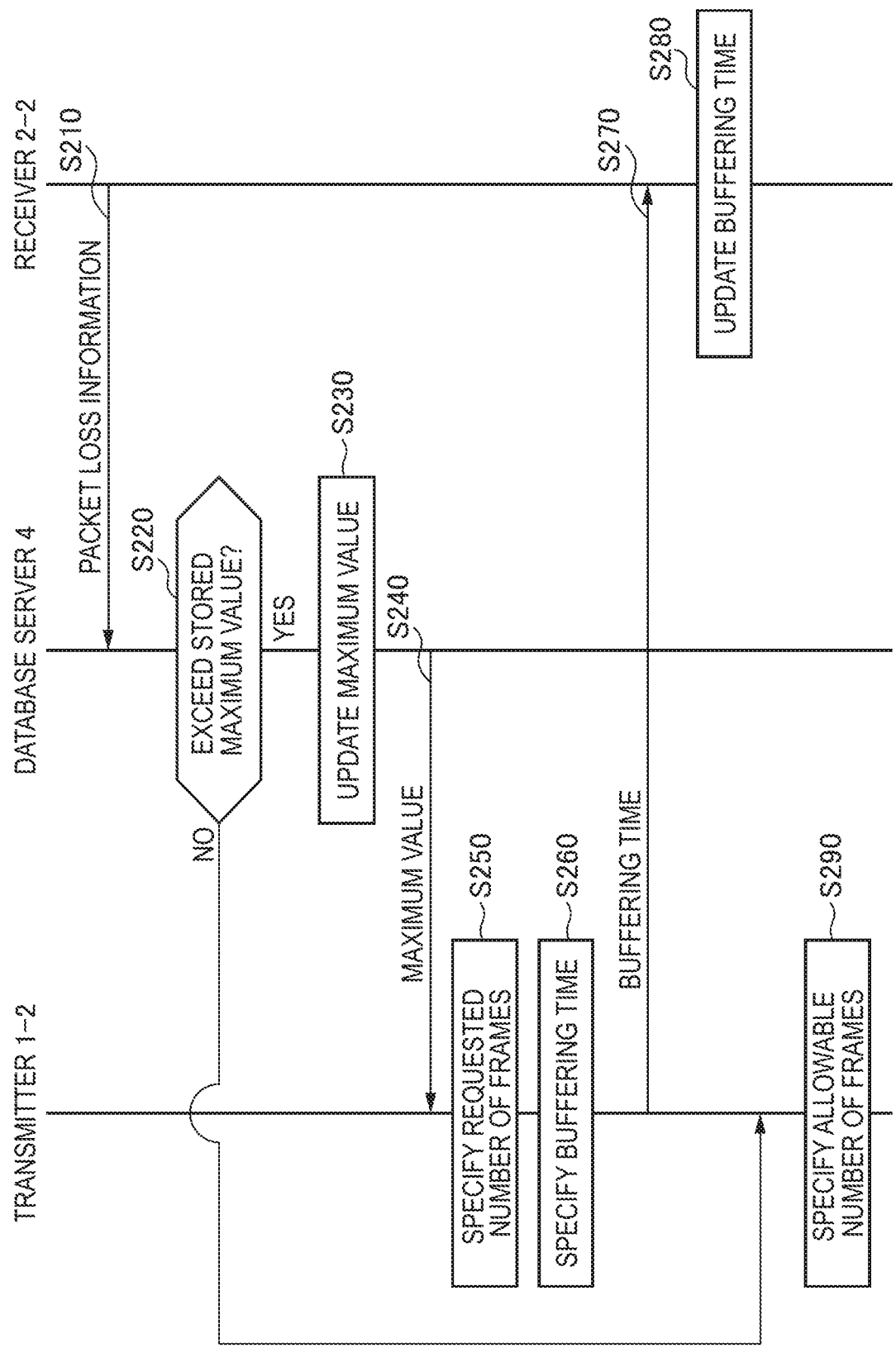
FIG. 10 is a diagram illustrated to describe an operation of the communication system according to the present embodiment.

The configuration example of the transmitter 1-2 and the receiver 2-2 included in the communication system 2000 according to the second embodiment of the present disclosure is described above. Subsequently, with reference to FIG. 10, an operation example of the communication system 2000 according to the present embodiment is described, particularly focusing on the operation related to specifying the number of frames and the operation related to specifying the buffering time. FIG. 10 is a diagram illustrated to describe the operation related to specifying the number of frames and to specifying the buffering time by the communication system 2000 according to the present embodiment.

First, the receiver 2-2 transmits the packet loss information (the number of consecutive losses) to the database server 4 (S210). Subsequently, the database server 4 compares the number of consecutive losses received in step S210 and the statistical information shared by RTCP with the stored maximum value (S220).

If there is no value exceeding the stored maximum value, the number-of-frames specifying unit 1522 of the transmitter 1-2 specifies the allowable number of frames $F_{allow}$ as the number of frames to be specified (S290) by using mathematical Formulas (2) and (3), which is similar to the method described in the first embodiment.

If there is a value exceeding the stored maximum value, the database server 4 updates the maximum value (a value exceeding the previous maximum value is set as the maximum value) (S230), and transmits the maximum value to the transmitter 1-2 (S240). In the following description, each of a loss number $L_{burst}$, an FEC encoding time $T_{enc\,max}$, an FEC decoding time $T_{dec\,max}$, and a packet transmission delay time $T_{shp\,max}$ occurring on the transmitter side due to smoothing or the like of the transmission packet is set as the maximum value transmitted from the database server 4.

Subsequently, the number-of-frames specifying unit 1522 of the transmitter 1-2 specifies the requested number of frames that is necessary to obtain the number of parities that is capable of recovering the maximum loss number $L_{burst}$ (S250). In one example, the number-of-frames specifying unit 1522 may specify the requested number of frames by the following procedure.

First, the number-of-frames specifying unit 1522 decides an ARQ re-transmittable number $N_{arq}$ by using a current buffering time $Bufftime_{old}$ in the receiver 2-2 as expressed in the following formula. In the following formula, β is set to a parameter satisfying 0<β<1.

$$N_{arq} = \frac{Bufftime_{old} * \beta - (RTT_{max}(1+\alpha)/2) - T_{slp\,max}}{RTT_{max} + T_{slp\,max}} \quad (4)$$

Subsequently, an error rate $P_{arq}$ in a case of performing $N_{arq}$-times retransmission is obtained by the following formula. In the following formula, $P_{net}$ is a network loss rate shared by RTCP or the like.

$$P_{arq} = P_{net}^{N_{arq}+1}(2-P_{net})^{N_{arq}} \quad (5)$$

Furthermore, after ARQ retransmission, the minimum $N_{data}$ at which the frame error rate after performing FEC processing is equal to or less than $P_{e\text{-}frame}$ is obtained. Here, the relationship of $N_{data}$ with $P_{e\text{-}frame}$ varies depending on the FEC scheme. Here, as an example, a relational expression of $N_{data}$ with $P_{e\text{-}frame}$ between the case of FEC scheme by Reed-Solomon code and the case of FEC scheme by low-density parity-check (LDPC) code is presented.

In one example, in the FEC scheme based on the Reed-Solomon code, the relationship of $N_{data}$ with $P_{e\text{-}frame}$ is expressed by the following formula.

$$P_{e\text{-}frame} \leq 1 - \left( \sum_{k=0}^{L_{burst}} \binom{N_{data}+L_{burst}}{k} P_{arq}^k (1-P_{arq})^{N_{data}+L_{burst}-k} \right) \quad (6)$$

Moreover, in the Reed-Solomon code, the maximum number of the FEC block original data $N_{data}$ is 223, and $L_{burst}$ is set to 32 if $L_{burst}$>32.

Further, in the FEC scheme based on the LDPC code, the relationship between $N_{data}$ and $P_{e\text{-}frame}$ is expressed by the following formula.

$$P_{e\text{-}frame} \leq \quad (7)$$
$$1 - \left( \sum_{k=0}^{L_{burst}} \binom{N_{data}+L_{burst}*R_{LDPC}}{k} P_{arq}^k (1-P_{arq})^{N_{data}+L_{burst}*R_{LDPC}-k} \right)$$

In mathematical Formula (7) above, $R_{LDPC}$ is an adjustment term corresponding to recovery performance of an LDPC code that satisfies $R_{LDPC} \geq 1$, and $L_{burst}$ losses are recoverable by parities of $L_{burst}*R_{LDPC}$.

Subsequently, the number-of-frames specifying unit 1522 obtains a requested number of frames $F_{req}$ as expressed in the following formula, by using the $N_{data}$ obtained by the relational expression corresponding to the FEC scheme as described above. Moreover, in the following formula, Rate represents the transmission rate, Bpp represents the average number of bytes per packet (Bytes per packet), and Fps represents the frame rate.

$$F_{req} = \frac{N_{data} * Bpp * 8}{Rate} * Fps \quad (8)$$

When the requested number of frames $F_{req}$ is specified, the buffering time specifying unit 1528 specifies a new buffering time $Bufftime_{new}$ in the receiver 2-2 (S260). In one example, the buffering time specifying unit 1528 may obtain the buffering time $Bufftime_{new}$ using the requested number of frames $F_{req}$ as in the following mathematical formulas.

$$Bufftime_{tmp} = \frac{F_{req}}{Fps} + \frac{FTT_{max}}{2}(1+\alpha) + T_{enc\,max} + T_{dec\,max} + T_{slp\,max} \quad (9)$$

$$Bufftime_{new} = \begin{cases} Bufftime_{old} * \beta & (Bufftime_{tmp} < Bufftime_{old} * \beta) \\ Bufftime_{tmp} & (\text{otherwise}) \end{cases} \quad (10)$$

Subsequently, the new buffering time $Bufftime_{new}$ obtained by mathematical Formula (10) is transmitted from the transmitter 1-2 to the receiver 2-2 (S270). The receiver 2-2, when receiving the new buffering time $Bufftime_{new}$, updates the buffering time (S280).

On the other hand, the transmitter 1-2 uses the new buffering time $Bufftime_{new}$ as the buffering time Bufftime to specify the allowable number of frames $F_{allow}$ as the number of frames to be specified using mathematical Formulas (2) and (3) described in the first embodiment (S290).

<2-3. Effect of Second Embodiment>

The second embodiment is described above. According to the present embodiment, it is possible to reduce the buffering time and Total time in FIG. 2 as compared with the case of using the fixed buffering time thereby further enhancing the real-time performance by updating the buffering time in the receiver.

<<3. Modified Example>>

The first and second embodiments of the present disclosure are described above. A modified example of each of the embodiments is described below. Moreover, the modified examples described below may be applied instead of the configuration described in each of the embodiments or may be additionally applied to the configurations described in each of the embodiments.

In the above embodiment, the example in which the transmitter and the receiver perform one-to-one communication is described, but the present technology is not limited to this example. The communication system according to the present technology may include a plurality of receivers as in the communication system illustrated in FIG. 1, in one example, and communication may be performed between one transmitter and the plurality of receivers. In one example, in the case where communication is performed between one transmitter and a plurality of receivers, the communication unit (transmission unit) of the transmitter transmits a plurality of frames that is subjected to FEC encoding and a parity packet obtained by FEC encoding to the plurality of receivers.

Further, particularly, in the second embodiment, in the case where communication is performed between one transmitter and a plurality of receivers, the number-of-frames specifying unit included in the transmitter may specify the number of frames on the basis of information obtained from a plurality of receivers. In one example, the number-offrames specifying unit may specify the number of frames on the basis of the number of burst losses (maximum loss value) of a receiver in which the largest burst loss occurs in the burst loss information obtained from the plurality of receivers. This configuration allows an FEC block to be constructed so that the packet loss is recoverable in a receiver in which the largest burst loss occurs, and so the packet loss in all the receivers is easily recovered. Moreover, the information obtained from the plurality of receivers may be obtained by transmitting information indicating the maximum value among the pieces of information of the plurality of receivers that are stored in the database server to the transmitter, which is similar to the example described in the second embodiment.

<<4. Hardware Configuration Example>>

The embodiments and modified examples of the present disclosure are described above. The information processing, such as specifying the number of frames and the FEC encoding, is implemented by cooperation of software and the hardware of a transmitter 1 described below.

Figure 11:
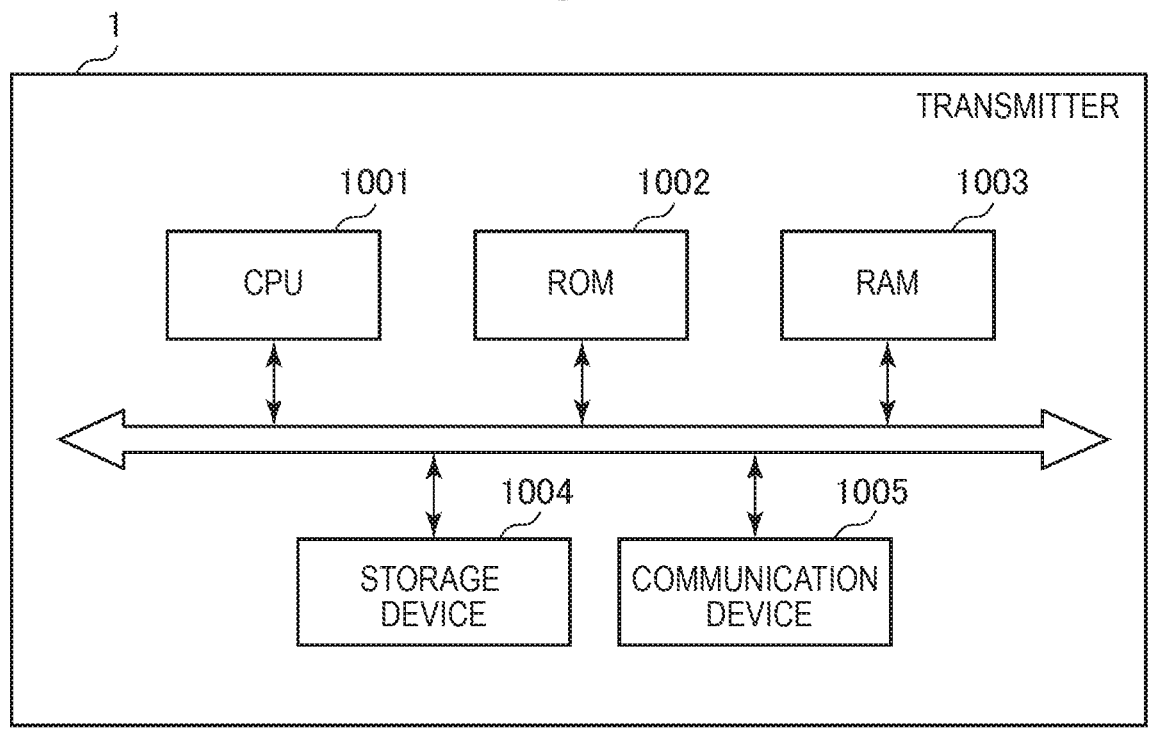
FIG. 11 is a diagram illustrated to describe a hardware configuration of a transmitter.

FIG. 11 is a diagram illustrated to describe a hardware configuration of the transmitter 1. As illustrated in FIG. 11, the transmitter 1 includes a central processing unit (CPU) 1001, a read-only memory (ROM) 1002, a random-access memory (RAM) 1003, a storage device 1004, and a communication device 1005.

The CPU 1001 functions as an arithmetic processing unit and a control unit, and controls the overall operation in the transmitter 1 in accordance with various programs. In addition, the CPU 1001 may be a microprocessor. The ROM 1002 stores an operation parameter, a program, or the like used by the CPU 1001. The RAM 1003 temporarily stores a program used for execution of the CPU 1001, a parameter that changes as appropriate in its execution, or the like. These components are interconnected via a host bus composed of a CPU bus or the like. The functions of the data encoder 104, the buffering unit 108, the FEC block combining determination unit 112, and the like are mainly implemented by cooperation of software with the CPU 1001, the ROM 1002, and the RAM 1003.

The storage device 1004 is a device for storing data. The storage device 1004 may include a storage medium, a recording device that records data in the storage medium, a reading device that reads data from the storage medium, a deletion device that deletes data recorded in the storage medium, and the like. The storage device 1004 corresponds to the storage unit 102 described with reference to FIG. 5, and stores programs executed by the CPU 1001 and various data.

The communication device 1005 is, in one example, a communication interface composed of a communication device or the like for connection to a communication network. In addition, the communication device 1005 may include a communication device compatible with a wireless local area network (LAN), a communication device compliant with long-term evolution (LTE), a wire communication device performing wired communication, or a Bluetooth communication device. The communication device 1005 corresponds to the communication unit 106 described with reference to FIG. 5.

Moreover, although the hardware configuration of the transmitter 1 is described above, the receiver 2 and the database server 4 also have hardware equivalent to the CPU 1001, the ROM 1002, the RAM 1003, and the like, similarly to the transmitter 1. Then, in one example, the functions of the decoding time decision unit 204, the FEC block determination unit 206, and the like are implemented by the cooperation of hardware and software of the receiver 2.

<<5. Concluding Remarks>>

As described above, according to the embodiment of the present disclosure, construction of the FEC block including a plurality of frames whose number corresponds to the number of frames based on network conditions makes it possible to recover packet loss before the time when image decoding starts.

It should be understood by those skilled in the art that various modifications, combinations, sub-combinations and alterations may occur depending on design requirements and other factors insofar as they are within the scope of the appended claims or the equivalents thereof.

In one example, although the example in the case of using the FEC scheme using the Reed-Solomon code or the LDPC code as FEC schemes is described in the second embodiment, but the present technology is not limited to this example. In one example, the present technology is applicable and is not limited the above as long as the FEC scheme that allows freely setting the number of original data (source) or parities is available. Moreover, as the FEC scheme, in the case where the FEC scheme using the Reed-Solomon code or the LDPC code is employed, in particular, the following effects are achievable.

In the FEC scheme using Reed-Solomon code (RS-FEC), the range that is recoverable by a parity is in FEC block units, and the number of packets that can be subjected to the RS-FEC is 32 (considering that the maximum parity is 32) is less than or equal to 223 packets. Under the above conditions, as the number of source packets included in the FEC block increases, the recovery range of the parity becomes wider. Thus, it is possible to generate an efficient parity by specifying the allowable maximum number of frames as described above.

Further, in the FEC scheme using the LDPC code (LDPC-FEC), it is known that the recovery performance of parity increases, as the number of source packets included in the FEC block increases. It is possible to improve the recovery performance of the LDPC-FEC by specifying the allowable number of frames so that the number of source packets included in the FEC block becomes the maximum depending on network conditions as described above.

Further, the respective steps in the above embodiments do not necessarily need to be processed in a time series following the sequence illustrated as the sequence diagram. In one example, each step in the processing of the above embodiments may be processed in an order different from the sequence illustrated as the sequence diagram, or may be processed in parallel.

Further, according to an embodiment of the present disclosure, it is possible to create a computer program causing hardware such as the CPU 1001, the ROM 1002, and the RAM 1003 to exhibit the similar functions to the respective components of the transmitter 1 described above. In addition, a recording medium on which the computer program is recorded is also provided.

Further, the effects described in this specification are merely illustrative or exemplified effects, and are not limitative. That is, with or in the place of the above effects, the technology according to an embodiment of the present disclosure may achieve other effects that are clear to those skilled in the art from the description of this specification.

Additionally, the present technology may also be configured as below.

(1) A transmitter including:
a transmission unit configured to transmit a parity packet obtained by performing FEC encoding on a plurality of frames in image data for each of the plurality of frames; and
a number-of-frames specifying unit configured to specify the number of frames of the plurality of frames to be subjected to the FEC encoding on the basis of a network transmission delay time.

(2) The transmitter according to (1),
in which the number-of-frames specifying unit specifies the number of frames further on the basis of an FEC encoding time necessary for the FEC encoding, an FEC decoding time necessary for FEC decoding of the parity packet in a receiver, and a buffering time in the receiver.

(3) The transmitter according to (2),
in which the number-of-frames specifying unit specifies, as the number of frames, the number of frames such that reception of the parity packet and the FEC decoding are completed before the buffering time elapses after reception of a first frame among the plurality of flames by the receiver.

(4) The transmitter according to (2) or (3),
in which the number-of-frames specifying unit uses a maximum value of the time necessary for the FEC encoding in a previous predetermined interval as the FEC encoding time and uses a maximum value of the time necessary for the FEC decoding in the previous predetermined interval as the FEC decoding time.

(5) The transmitter according to any one of (2) to (4),
in which the number-of-frames specifying unit specifies the number of frames further on the basis of burst loss information.

(6) The transmitter according to (5), further including:
a buffering time specifying unit configured to specify the buffering time on the basis of the burst loss information,
in which the transmission unit transmits the buffering time specified by the buffering time specifying unit to the receiver.

(7) The transmitter according to (6),
in which the transmission unit transmits the plurality of frames and the parity packet to a plurality of the receivers, and
the number-of-frames specifying unit specifies the number of frames on the basis of the number of burst losses of the receiver in which a largest burst loss occurs among pieces of the burst loss information obtained from the plurality of receivers.

(8) The transmitter according to any one of (1) to (7), further including:
a timeout detection unit configured to detect a timeout in a case where a standby time for the FEC encoding to start reaches a limit standby time; and
an FEC encoding unit configured to perform the FEC encoding on a plurality of frames whose number corresponds to the number of frames smaller than the number of frames in a case where the timeout detection unit detects the timeout.

(9) The transmitter according to (8),
in which the limit standby time is specified on the basis of an FEC encoding time necessary for the FEC encoding, an FEC decoding time necessary for FEC decoding of the parity packet in a receiver, and a buffering time in the receiver.

(10) A transmission method including:
transmitting a parity packet obtained by performing FEC encoding on a plurality of frames in image data for each of the plurality of frames; and
specifying the number of flames of the plurality of frames to be subjected to the FEC encoding on the basis of a network transmission delay time.

(11) A communication system including:
a transmitter including
a transmission unit configured to transmit a parity packet obtained by performing FEC encoding on a plurality of frames in image data for each of the plurality of frames, and
a number-of-frames specifying unit configured to specify the number of frames of the plurality of frames to be subjected to the FEC encoding on the basis of a network transmission delay time; and
a receiver configured to receive the parity packet and perform FEC decoding using the received parity packet.

DESCRIPTION OF REFERENCE SIGNS

1 Transmitter
2 Receiver
3 Communication network
4 Data base server
102 Storage unit
104 Data encoder
106, 156 Communication unit
108 Buffering unit
112, 152 Block combining determination unit
114 Encoder unit
202, 252 Communication unit
204, 254 Decoding time decision unit
206 Block determination unit
208 Buffering unit
210 Decoding determination unit
212 Decoding unit
214 Data extraction unit
216 Data decoder unit
218 Output unit
256 Packet loss determination unit
1000, 2000 Communication system

What is claimed is:

1. A transmitter comprising:
circuitry configured to
determine a number of frames of a plurality of frames to be subjected to forward error correction (FEC) encoding based on a network transmission delay time;
store frames until a number of the stored frames reaches the determined number of frames;
perform the FEC encoding on the stored frames when the number of stored frames reaches the determined number of frames; and
transmit a parity packet obtained by performing the FEC encoding on the plurality of frames, wherein
the number of frames is less than or equal to $F_{ps} * T_{mff}$ where $F_{ps}$ is a frame rate and $T_{mff}$ is a frame combinable time.

2. The transmitter according to claim 1, wherein the circuitry is further configured to:
determine the number of frames further based on a FEC encoding time necessary for the FEC encoding, a FEC decoding time necessary for FEC decoding of the parity packet in a receiver, and a buffering time in the receiver.

3. The transmitter according to claim 2, wherein the circuitry is further configured to:
determine the number of frames such that reception of the parity packet and the FEC decoding are completed before the buffering time elapses after reception of a first frame among the plurality of frames by the receiver.

4. The transmitter according to claim 2, wherein the circuitry is configured to
use a maximum value of the time necessary for the FEC encoding in a previous-interval as the FEC encoding time and use a maximum value of the time necessary for the FEC decoding in the previous interval as the FEC decoding time.

5. The transmitter according to claim 2, wherein the circuitry is further configured to
determine the number of frames further based on burst loss information.

6. The transmitter according to claim 5, wherein the circuitry is further configured to
specify the buffering time based on the burst loss information, and
transmit the buffering time to the receiver.

7. The transmitter according to claim 6, wherein the circuitry is further configured to:
transmit the plurality of frames and the parity packet to a plurality of receivers, the plurality of receivers including the receiver, and
determine the number of frames based on a number of burst losses of one of the plurality of receivers in which a largest burst loss occurs among pieces of the burst loss information obtained from the plurality of receivers.

8. The transmitter according to claim 1, wherein the circuitry is further configured to:
detect a timeout in a case where a standby time before the FEC encoding starts, reaches a time limit; and
perform the FEC encoding on a subset of the plurality of frames in a case that the timeout is detected.

9. The transmitter according to claim 8,
wherein the time limit is specified based on a FEC encoding time necessary for the FEC encoding, a FEC decoding time necessary for FEC decoding of the parity packet in a receiver, and a buffering time in the receiver.

10. The transmitter according to claim 1, wherein the frame combinable time is determined using:

$$T_{mff} = Bufftime - \frac{RTT}{2}(1+\alpha) - T_{enc} - T_{dec} - T_{shp}$$

where Bufftime is a buffering time, RTT is the network transmission delay time, $\alpha$ is an offset term, $T_{enc}$ is a maximum value of time necessary for FEC encoding in the previous interval, $T_{dec}$ is a maximum value of time necessary for FEC decoding in the previous interval, and $T_{shp}$ is a maximum value of a packet transmission delay time.

11. The transmitter according to claim 1, wherein the frame combinable time is based on a FEC encoding time necessary for the FEC encoding, a FEC decoding time necessary for FEC decoding of the parity packet in a receiver, and a buffering time in the receiver.

12. A transmission method comprising:
determining a number of frames of a plurality of frames to be subjected to FEC encoding based on a network transmission delay time;
storing frames until a number of the stored frames reaches the determined number of frames;
performing the FEC encoding on the stored frames when the number of stored frames reaches the determined number of frames; and
transmitting a parity packet obtained by performing the FEC encoding on the plurality of frames, wherein
the number of frames is less than or equal to $F_{ps}*T_{mff}$ where $F_{ps}$ is a frame rate and $T_{mff}$ is a frame combinable time.

13. The transmission method according to claim 12, wherein the frame combinable time is based on a FEC encoding time necessary for the FEC encoding, a FEC decoding time necessary for FEC decoding of the parity packet in a receiver, and a buffering time in the receiver.

14. A communication system comprising:
a transmitter including circuitry configured to
determine a number of frames of a plurality of frames to be subjected to FEC encoding based on a network transmission delay time,
store frames until a number of the stored frames reaches the determined number of frames,
perform the FEC encoding on the stored frames when the number of stored frames reaches the determined number of frames, and
transmit a parity packet obtained by performing the FEC encoding on the plurality of frames; and
a receiver configured to receive the parity packet and perform FEC decoding using the received parity packet, wherein
the number of frames is less than or equal to $F_{ps}*T_{mff}$ where $F_{ps}$ is a frame rate and $T_{mff}$ is a frame combinable time.

15. The communication system according to claim 14, wherein the frame combinable time is based on a FEC encoding time necessary for the FEC encoding, a FEC decoding time necessary for the FEC decoding of the parity packet in the receiver, and a buffering time in the receiver.

* * * * *